United States Patent
Moon et al.

(10) Patent No.: US 9,224,190 B2
(45) Date of Patent: Dec. 29, 2015

(54) METHOD AND APPARATUS FOR PROCESSING IMAGE TAKEN UNDER LOW ILLUMINATION ENVIRONMENT

(71) Applicant: SAMSUNG ELECTRONICS CO., LTD., Suwon-si (KR)

(72) Inventors: Young Su Moon, Seoul (KR); Yong Min Tai, Gunpo-si (KR); Shi Hwa Lee, Seoul (KR); Gyeong Ja Jang, Seoul (KR); Jung Uk Cho, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 81 days.

(21) Appl. No.: 13/929,158

(22) Filed: Jun. 27, 2013

(65) Prior Publication Data
US 2014/0016866 A1 Jan. 16, 2014

(30) Foreign Application Priority Data
Jul. 10, 2012 (KR) .......................... 10-2012-0074951

(51) Int. Cl.
*G06K 9/40* (2006.01)
*G06T 5/00* (2006.01)
*G06T 5/50* (2006.01)

(52) U.S. Cl.
CPC . *G06T 5/00* (2013.01); *G06T 5/003* (2013.01); *G06T 5/50* (2013.01); *G06T 2207/10016* (2013.01); *G06T 2207/20182* (2013.01); *G06T 2207/20201* (2013.01)

(58) Field of Classification Search
None
See application file for complete search history.

(56) References Cited

U.S. PATENT DOCUMENTS

| | | | | |
|---|---|---|---|---|
| 6,125,201 A | * | 9/2000 | Zador | 382/166 |
| 6,778,210 B1 | * | 8/2004 | Sugahara et al. | 348/208.4 |
| 6,809,758 B1 | * | 10/2004 | Jones | 348/208.99 |
| 8,538,192 B2 | * | 9/2013 | Habuka et al. | 382/274 |
| 2002/0001416 A1 | | 1/2002 | Zhou et al. | |
| 2002/0113984 A1 | * | 8/2002 | Nakajima et al. | 358/1.9 |
| 2003/0012404 A1 | * | 1/2003 | Matsumura et al. | 382/100 |
| 2003/0021478 A1 | * | 1/2003 | Yoshida | 382/195 |
| 2008/0095436 A1 | * | 4/2008 | Kim et al. | 382/173 |
| 2009/0040364 A1 | | 2/2009 | Rubner | |
| 2009/0185041 A1 | * | 7/2009 | Kang et al. | 348/208.1 |
| 2011/0122266 A1 | | 5/2011 | Jang | |

FOREIGN PATENT DOCUMENTS

| | | | | |
|---|---|---|---|---|
| JP | WO2012/056518 | * | 5/2012 | H04N 5/225 |
| KR | 10-2002-0032765 A | | 5/2002 | |
| KR | 10-2005-0022748 A | | 3/2005 | |

(Continued)

OTHER PUBLICATIONS

Al-Samaraie; "A New Enhancement Approach for Enhancing Image of Digital Camera by Changing the Contrast"; International Journal of Advanced Science and Technology, vol. 32, Jul. 2011, pp. 13-22.*

*Primary Examiner* — Eueng-Nan Yeh
(74) *Attorney, Agent, or Firm* — Staas & Halsey LLP

(57) ABSTRACT

A method and apparatus for processing an image for enhancing an image quality captured in a low illumination environment is disclosed. The method for processing the image may include estimating motion information based on a base frame among input frames captured using a short exposure time and high ISO sensitivity conditions, removing noise of the base frame using the motion information, and enhancing an image quality of the base frame from which the noise has been removed using a reference frame captured under a long exposure condition.

20 Claims, 6 Drawing Sheets

(56) References Cited

FOREIGN PATENT DOCUMENTS

| KR | 10-2005-0057829 A | 6/2005 |
|---|---|---|
| KR | 10-2007-0117840 A | 12/2007 |
| KR | 10-2008-0081489 A | 9/2008 |
| KR | 10-2011-0084027 A | 7/2011 |
| KR | 10-2012-0034042 A | 4/2012 |
| KR | 10-2012-0074960 A | 7/2012 |

* cited by examiner

METHOD AND APPARATUS FOR PROCESSING IMAGE TAKEN UNDER LOW ILLUMINATION ENVIRONMENT

CROSS-REFERENCE TO RELATED APPLICATIONS

This application claims the priority benefit of Korean Patent Application No. 10-2012-0074951, filed on Jul. 10, 2012, in the Korean Intellectual Property Office, the disclosure of which is incorporated herein by reference.

BACKGROUND

1. Field

One or more example embodiments of the present disclosure relate to a method for enhancing an image quality captured in a low illumination environment, and more particularly, to a method for enhancing an image quality using a plurality of images having distinct exposure conditions.

2. Description of the Related Art

When capturing an image with an image capturing apparatus such as a camera in a low illumination environment, such as a poorly illuminated or dark environment, two types of image quality degradation issues may generally occur. Firstly, when a long exposure time is set to sufficiently capture an image, a shutter speed may be lengthened, and motion blur may arise in the captured image due to the image capturing apparatus being shaken or due to movement of an object in the image. Secondly, when a high International Standards Organization (ISO) in a short exposure time is set for capture, strong image noise and color distortion may pose a problem.

Accordingly, research has been conducted on developing technology for removing the motion blur in a single frame of an image result and high-efficiency technology for removing noise to resolve the image quality degradation issues when an image is captured in the low illumination environment.

Recently, due to a constant desire for technology for obtaining a high definition image in a low illumination environment, technology is being developed for capturing a plurality of images successively, rather than a single image, by fusing the plurality of captured images.

SUMMARY

The foregoing and/or other aspects are achieved by providing a method for processing an image, the method including estimating motion information based on a base frame among input frames captured under short exposure and high ISO conditions, in a low illumination environment, removing noise of the base frame using the estimated motion information, and enhancing an image quality of the base frame from which the noise has been removed using a reference frame captured under long exposure conditions, in a low illumination environment.

The removing of the noise of the base frame may include performing noise filtering on a temporal axis of the base frame based on the estimated motion information, performing noise filtering on a spatial axis of the base frame for which the noise filtering is performed on the temporal axis.

The foregoing and/or other aspects are achieved by providing an apparatus for processing an image, the apparatus including a motion information estimating unit to estimate motion information based on a base frame among input frames captured under short exposure and high ISO conditions, in a low illumination environment, a noise removing unit to remove noise of the base frame using the motion information, and an image quality enhancing unit to enhance an image quality of the base frame from which the noise has been removed using a reference frame captured under long exposure conditions, in a low illumination environment.

The foregoing and/or other aspects are achieved by providing a method of processing an image. The method includes capturing an image frame in a low illumination environment using a relatively short exposure time and high ISO sensitivity conditions, capturing a reference frame using a relatively longer exposure time in comparison with the relatively short exposure time, and restoring, by way of a processor, the image frame captured in the low illumination environment using the reference frame.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
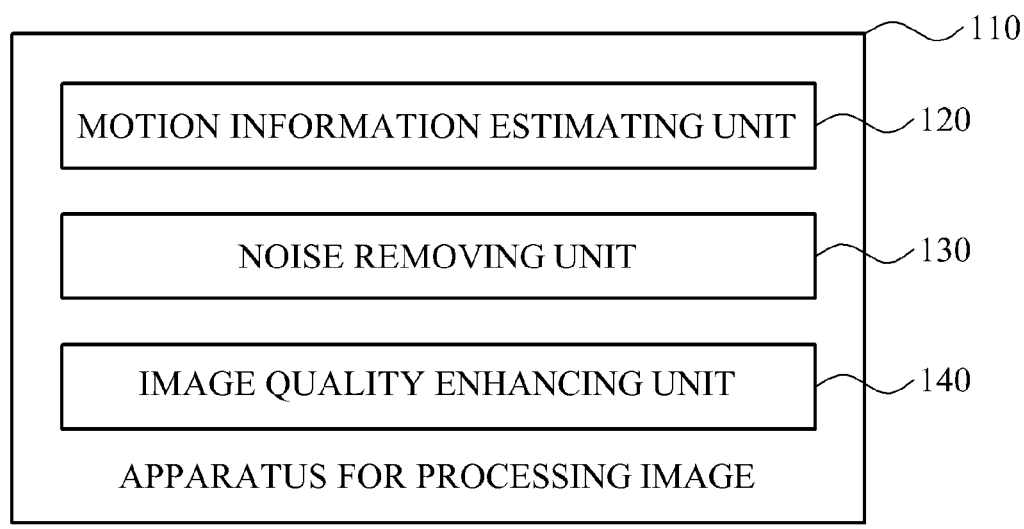
FIG. 1 illustrates a diagram of a detailed configuration of an apparatus for processing an image according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a diagram of a detailed configuration of an apparatus for processing an image according to one or more example embodiments.

Referring to FIG. 1, the apparatus for processing the image 110 may include, for example, a motion information estimating unit 120, a noise removing unit 130, and an image quality enhancing unit 140.

The apparatus for processing the image 110 may be located inside an image capturing apparatus such as a camera or outside and separately embodied from the image capturing apparatus, and may receive input frames and a reference frame from the image capturing apparatus. However, the image capturing apparatus may not be limited to the preceding example embodiments, and may include any apparatus for obtaining an image.

The apparatus for processing the image 110 may restore an image captured in a low illumination environment to be equal to or similar to an image having ideal levels of brightness and color using input frames captured using a short exposure time and high ISO sensitivity conditions and the reference frame captured under an ideal exposure condition, for example, a relatively longer exposure time compared with the short exposure time. In an embodiment, the input frames are captured using the short exposure time to minimize a potential motion blur of the image, for example.

Also, the apparatus for processing the image 110 may receive information associated with an exposure condition and an ISO sensitivity condition when images of the input frames and the reference frame are captured, e.g., from the image capturing apparatus, and use the received information for restoring the images. In an embodiment, the restoring of the images includes improving levels of brightness and color in the images compared with the levels of brightness and color of the image frame captured in the low illumination environment.

The motion information estimating unit 120 may estimate motion information based on the base frame, among the input frames captured under short exposure time and high ISO conditions, in a low illumination environment. For example, the motion information estimating unit 120 may estimate a motion among images occurring due to the input frames being captured using a hand-held device. Alternatively, the motion information estimating unit 120 may estimate a motion among images occurring due to movement of an object.

Hereinafter, it is assumed that the input frames are captured using a short exposure time and high ISO conditions, in a low illumination environment.

The motion information estimating unit 120 may estimate motion information using a plurality of input frames, and predetermine a base frame from among the plurality of input frames. For example, the motion information estimating unit 120 may predetermine an input frame captured first to be the base frame.

The motion information estimating unit 120 may estimate the motion information of the input frames using brightness information of the input frames.

The motion information estimating unit 120 may convert an image of an input frame in order to estimate the motion information. For example, the motion information estimating unit 120 may convert a red green blue (RGB) color image to a YCbCr color image. The motion information estimating unit 120 may estimate the motion information using a brightness image, for example an image Y, in the converted YCbCr color image.

Alternatively, the motion information estimating unit 120 may estimate the motion information using only a channel image G from a raw Bayer image when a raw image of a camera sensor is used as an input frame.

The motion information estimating unit 120 may estimate global motion information of an input frame using images converted in the input frames. For example, the motion information estimating unit 120 may estimate global motion information among input frames by comparing brightness images of the input frames, based on a brightness image of a base frame.

The motion information estimating unit 120 may estimate the global motion information using an image matching scheme based on an image difference among input frames. For example, when an input frame is created while an image capturing apparatus or an object is in a translational motion, the motion information estimating unit 120 may estimate motion information of horizontal and vertical directions using the image matching scheme based on the image difference among the input frames.

Also, the motion information estimating unit 120 may estimate the global motion information using cumulative one-dimensional (1D) curves of horizontal and vertical directions of the input frames, and a cross-correlation maximization scheme. Transitively the motion information estimating unit 120 may estimate motion information of the translational motion having a high speed and noise endurance, in a high resolution, low illumination, noise image.

Alternatively, the motion information estimating unit 120 may estimate the motion information efficiently based on coarse-to-fine motion estimating schemes using an image pyramid, such as a Laplacian pyramid.

The motion information estimating unit 120 may set a searching area for image matching based on global motion information. For example, the motion information estimating unit 120 may set an image block of a regular size for each image pixel of an input frame, and set the searching area for image matching based on global motion information in another input frame.

The motion information estimating unit 120 may estimate local motion information of an input frame using a searching area set for processing a local motion change of an image. For example, the motion information estimating unit 120 may estimate local motion information based on a similarity among blocks determined by performing block matching in the set searching area.

Alternatively, the motion information estimating unit 120 may divide a base frame into blocks of a regular size, and estimate the local motion information using the scheme described above for each block. Transitively, the motion information estimating unit 120 may estimate the motion information on a high resolution image relatively quickly.

According to another example embodiment, the motion information estimating unit 120 may selectively determine whether to estimate the local motion information. For example, the motion information estimating unit 120 may estimate the global motion information based on settings or processing, and estimate the local motion information selectively.

The noise removing unit 130 may remove noise of a base frame using motion information estimated by the motion information estimating unit 120. More particularly, the noise removing unit 130 may perform noise removal in a three-dimensional (3D) space by performing noise filtering on a temporal axis and noise filtering on a spatial axis.

The noise removing unit 130 may perform noise filtering using pixels of an input frame corresponding to pixels of the base frame. For example, the noise removing unit 130 may perform noise filtering on the temporal axis by calculating a simple average pixel values of the input frame corresponding to pixel values of the base frame using the global motion information and the local motion information.

The noise removing unit 130 may perform noise filtering on the spatial axis with respect to the base frame from which noise has been filtered out on the temporal axis. The noise removing unit 130 may perform noise filtering by setting a kernel area of a regular size for the pixels of the base frame.

For example, the noise removing unit 130 may perform two-dimensional (2D) noise filtering using a bilateral filter or a non-local means. Also, the noise removing unit 130 may perform noise filtering using a discrete cosine transform.

Accordingly, the noise removing unit 130 may remove noise of an image effectively by performing noise filtering on a one-dimensional (1D) temporal axis and noise filtering on a 2D spatial axis.

The image quality enhancing unit 140 may enhance an image quality of a base frame from which noise has been removed using a reference frame captured under a relatively long exposure condition, in a low illumination environment. For example, an exposure value of the long exposure time may be an exposure value of an auto mode or an exposure value greater than the exposure value of the auto mode by a value of "1". However, the long exposure condition may not be limited thereto, and may be determined to be relatively long time in comparison with an exposure value of a short exposure. More particularly, the long exposure may be defined as an exposure condition in which an exposure value of the long exposure is greater than an exposure value of the short exposure or in which an exposure time of the long exposure is greater than an exposure time of the short exposure.

Hereinafter, the reference frame is assumed to be captured in the long exposure condition, in the low illumination environment. Due to the reference frame being captured in the long exposure condition, brightness and color information of the reference frame may be better than those of an input frame. The image enhancing unit 140 may enhance brightness and a color of the base frame from which noise has been removed using image information of the reference frame.

The image quality enhancing unit 140 may enhance an image quality of the base frame using a relationship between the base frame from which noise has been removed and the reference frame. More particularly, the image quality enhancing unit 140 may enhance an image of the reference frame using a brightness conversion relationship derived from histogram matching, between the base frame from which noise has been removed and the reference frame.

Further, the image quality enhancing unit 140 may enhance an image quality of the base frame using a brightness conversion relationship model calculated in real time. Transitively, the image quality enhancing unit 140 may restore a high definition image having ideal brightness and color in a low illumination environment. More particularly, the image quality enhancing unit 140 may remove noise occurring due to a high ISO sensitivity condition from an image captured in a low illumination environment, and output a vivid image having ideal brightness by removing a motion blur occurring due to a long exposure time.

According to another example embodiment, the image quality enhancing unit 140 may perform the enhancing of the image quality of the reference frame, and subsequently, selectively perform various post-processing processes to improve a detail of an image.

The image quality enhancing unit 140 may perform correcting with respect to brightness and a color using an image captured with a short exposure time and under high ISO conditions and an image captured with the long exposure time. For example, the image quality enhancing unit 140 may perform correcting of an image quality adaptively, using the image captured with the short exposure time and under the high ISO conditions and the image captured with the long exposure time.

The image quality enhancing unit 140 may perform brightness conversion that coincides with an actual capturing condition as the reference frame actually captured with the long exposure time, in the low illumination environment is used.

According to another example embodiment, the image quality enhancing unit 140 may enhance an image quality of the base frame using a brightness conversion relationship derived from calibration.

For example, the image quality enhancing unit 140 may enhance the image quality of the base frame using a brightness conversion model stored in a form of a lookup table (LUT). By way of example, the image quality enhancing unit 140 may use the brightness conversion model stored in the form of an LUT rather than in the form of real-time modeling with respect to a brightness conversion relationship formula.

Figure 2:
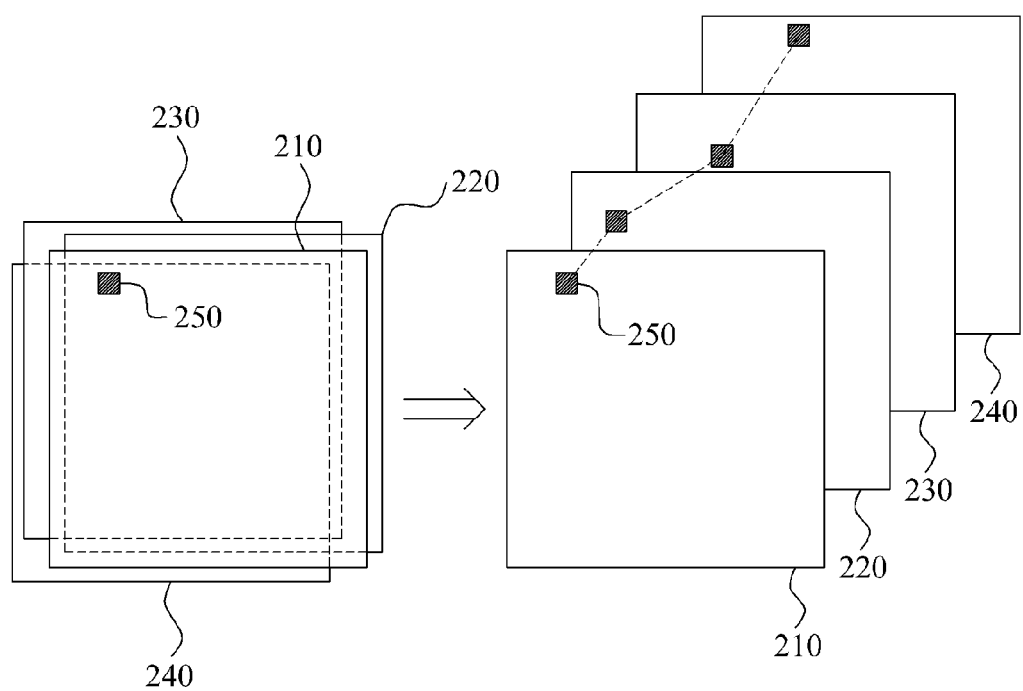
FIG. 2 illustrates a diagram of an example in which motion information of an input frame is estimated according to example embodiments.

FIG. 2 illustrates a diagram of an example in which motion information of an input frame is estimated according to example embodiments.

An apparatus for processing an image may estimate motion information using a plurality of input frames 210 to 240, and predetermine a base frame from among the plurality of input frames 210 to 240. In FIG. 2, a first input frame 210 may be set as a base frame.

The apparatus for processing the image may estimate global motion information and local motion information based on the base frame 210 by comparing the base frame 210 with the input frames 220 to 240.

The apparatus for processing the image may align locations of the input frames 220 to 240 with the base frame 210 set as a standard based on the global motion information and the local motion information. As a result, an effect identical to capturing an image with a fixed image capturing apparatus is produced. In particular, the apparatus for processing the image may geometrically match physically similar areas in a plurality images using the motion information.

The apparatus for processing the image may estimate the global motion information using an image matching scheme based on an image difference among the input frames 210 to 240, or using a cross-correlation maximization searching scheme between horizontal and vertical 1D curves.

The apparatus for processing the image may estimate the local motion information based on the global motion information. For example, the apparatus for processing the image may set an image block 250 of a regular size for each pixel of an image, and set a searching area for image matching in the input frames 220 to 240. The apparatus for processing the image may set the searching area, perform block matching, and estimate an amount of motion having a highest similarity among blocks to be the local motion information.

Figure 3:
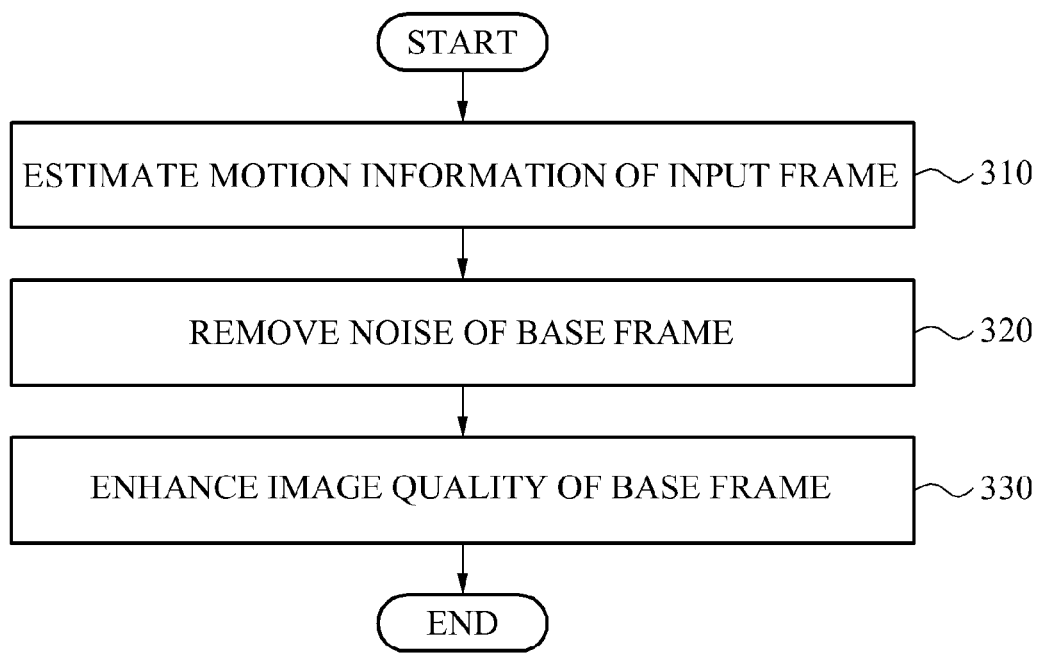
FIG. 3 is a flowchart illustrating an operation for enhancing an image quality of a base frame according to example embodiments.

FIG. 3 is a flowchart illustrating an operation for enhancing an image quality of a base frame according to example embodiments.

In operation 310, an apparatus for processing an image may estimate motion information based on the base frame among input frames. The apparatus for processing the image may perform image conversion of the input frames using brightness information of the input frames for estimating the motion information.

The apparatus for processing the image may estimate global motion information and local motion information using the input frames for which images are converted.

In operation 320, the apparatus for processing the image may remove noise of the base frame using the motion information estimated in operation 310. More particularly, the apparatus for processing the image may remove noise of the base frame by performing noise filtering on a 1D temporal axis and noise filtering on a 2D spatial axis.

In operation 330, the apparatus for processing the image may enhance an image quality of the base frame from which noise has been removed using a reference frame captured under a long exposure condition. The apparatus for processing the image may enhance brightness and color of the base frame from which noise has been removed using image information of the reference frame. For example, the apparatus for processing the image may enhance an image quality of the base frame using a brightness conversion relationship derived from histogram matching between the base frame from which noise has been removed, and the reference frame.

Alternatively, the apparatus for processing the image may enhance an image quality of the base frame using the brightness conversion relationship derived from calibration. For example, the apparatus for processing the image may enhance an image quality of the base frame using a brightness conversion model stored in the form of a LUT.

Figure 4:
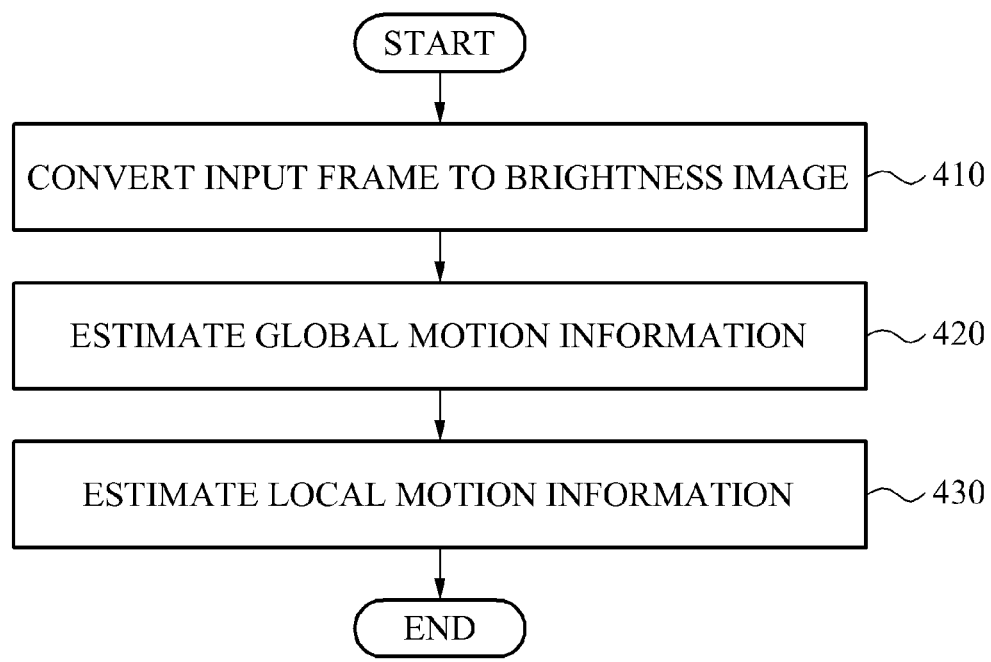
FIG. 4 is a flowchart illustrating a detailed operation of estimating motion information of an input frame according to example embodiments.

FIG. 4 is a flowchart illustrating a detailed operation of estimating motion information of an input frame according to example embodiments.

In operation 410, the apparatus for processing the image may convert an input frame to a brightness image. For example, the apparatus for processing the image may extract a Y image by converting a red green blue (RGB) color image to a YCbCr color image.

In operation 420, the apparatus for processing the image may estimate global motion information of an input frame using input frames for which an image is converted. For example, the apparatus for processing the image may estimate global motion information among other input frames by comparing brightness images of the other input frames based on a brightness image of a base frame.

The apparatus for processing the image may estimate global motion information using an image matching scheme based on an image difference among input frames. Also, the apparatus for processing the image may estimate global motion information using cumulative 1D curves for horizontal and vertical directions of input frames and a cross-correlation maximization searching scheme.

In operation 430, the apparatus for processing the image may estimate local motion information of an input frame based on the estimated global motion information. For example, the apparatus for processing the image may perform block matching in the set searching area, and estimate an amount of motion having a highest similarity among blocks to be the local motion information.

Alternatively, the apparatus for processing the image may divide the base frame into blocks of a regular size, and estimate the local motion information using the scheme described in the preceding.

Figure 5:
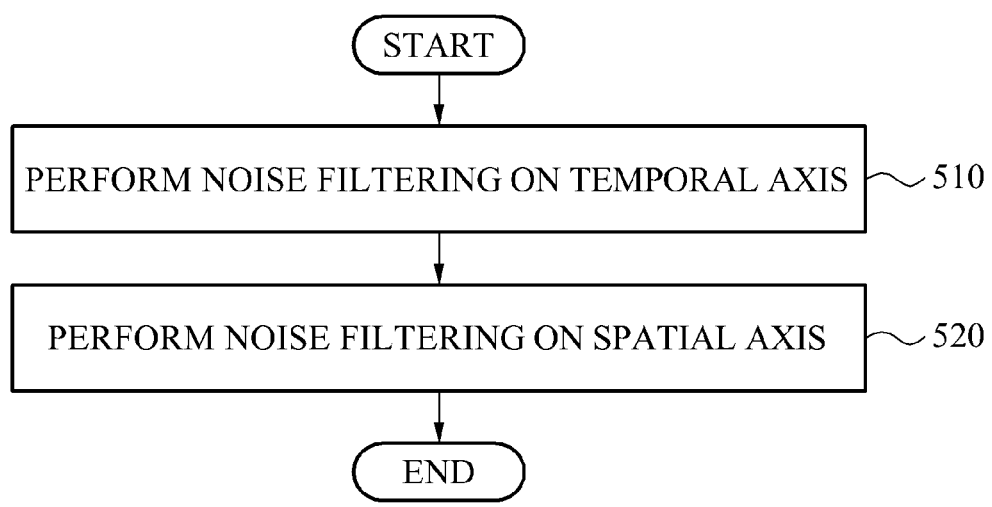
FIG. 5 is a flowchart illustrating a detailed operation of removing noise of a base frame according to example embodiments.

FIG. 5 is a flowchart illustrating a detailed operation of removing noise of a base frame according to example embodiments.

In operation 510, the apparatus for processing the image may perform noise filtering using pixels of an input frame corresponding to pixels of the base frame. For example, the apparatus for processing the image may perform noise filtering on a temporal axis by calculating a simple average of the pixel values of the input frame corresponding to the pixel values of base frames using global motion information and local motion information.

In operation 520, the apparatus for processing the image may perform noise filtering on a spatial axis with respect to the base frame from which noise has been filtered out on the temporal axis. The apparatus for processing the image may perform noise filtering by setting a kernel area of a regular size for each pixel of the base frame. For example, the apparatus for processing the image may perform 2D noise filtering using a bilateral filter or a non-local means.

Figure 6:
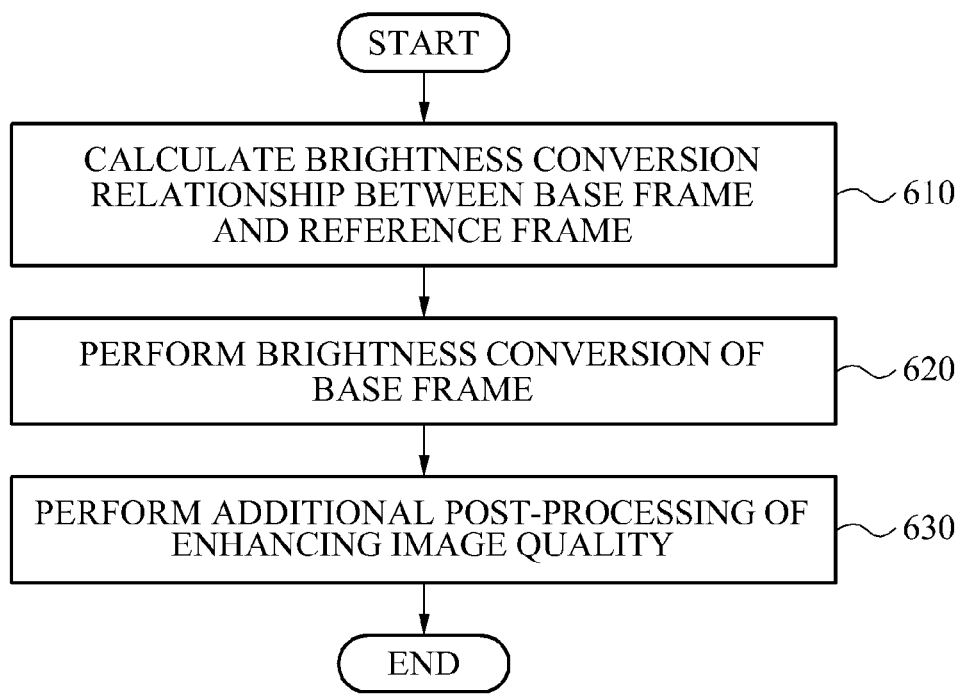
FIG. 6 is a flowchart illustrating a detailed operation of enhancing an image quality of a base frame according to example embodiments.

FIG. 6 is a flowchart illustrating a detailed operation of enhancing an image quality of a base frame according to example embodiments.

In operation 610, the apparatus for processing the image may calculate a brightness conversion relationship between a base frame and a reference frame captured using a long exposure time. For example, the apparatus for processing the image may derive the brightness conversion relationship through histogram matching between the base frame from which noise has been removed, and the reference frame. In particular, the apparatus for processing the image may use a brightness conversion relationship model calculated in real time.

In operation 620, the apparatus for processing the image may perform brightness converting of the base frame using the brightness conversion relationship derived. In particular, the apparatus for processing the image may enhance brightness and color of the base frame from which noise has been removed using the brightness conversion relationship derived.

In operation 630, the apparatus for processing the image may perform a process of enhancing an image quality of the base frame, and selectively perform various post-processing for enhancing details of an image.

A portable device as used throughout the present specification includes mobile communication devices, such as a personal digital cellular (PDC) phone, a personal communication service (PCS) phone, a personal handyphone system (PHS) phone, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), a navigation system, for example, a global positioning system (GPS) navigation system, and the like. Also, the portable device as used throughout the present specification includes a digital camera, a plasma display panel, and the like.

The methods for processing an image according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the apparatusses for processing an image described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method for processing an image, the method comprising:
   estimating motion information based on a base frame among input frames captured using a relatively short exposure time;
   removing, by way of a processor, noise from the base frame using the estimated motion information; and
   enhancing an image quality of the base frame from which the noise has been removed using a reference frame captured using a relatively long exposure time,
   wherein the removing of the noise from the base frame comprises:
   performing noise filtering on a temporal axis of the base frame based on the estimated motion information; and
   performing noise filtering on a spatial axis of the base frame for which the noise filtering has been performed on the temporal axis.

2. The method of claim 1,
   wherein the enhancing of the image quality of the base frame comprises enhancing brightness of the base frame from which noise has been removed using image information of the reference frame.

3. The method of claim 1, wherein the estimating of the motion information comprises:
   estimating global motion information and local motion information using brightness information of the input frames.

4. The method of claim 3, wherein the estimating of the motion information comprises:
   estimating global motion information using an image matching scheme based on an image difference between the input frames.

5. The method of claim 3, wherein the estimating of the motion information comprises:
   estimating the global motion information using cumulative one-dimensional (1D) curves for horizontal and vertical directions of the input frames, and a cross-correlation maximization searching scheme.

6. The method of claim 1, wherein the performing of the noise filtering on the temporal axis comprises:
   performing noise filtering using pixels of the input frames corresponding to pixels of the base frame.

7. The method of claim 1, wherein the performing of the noise filtering on the spatial axis comprises:
   performing noise filtering by setting a kernel area of a regular size for pixels of the base frame.

8. The method of claim 1, wherein the enhancing of the image quality of the base frame comprises:
   enhancing the image quality of the base frame using a brightness conversion relationship between the base frame and the reference frame.

9. The method of claim 8, wherein the enhancing of the image quality of the base frame comprises:
   enhancing the image quality of the base frame using a brightness conversion relationship derived from histogram matching.

10. The method of claim 8, wherein the enhancing of the image quality of the base frame comprises:
    enhancing the image quality of the base frame using a brightness conversion relationship derived from calibration.

11. The method of claim 1, wherein an exposure value of the long exposure time is an exposure value of an auto mode or an exposure value greater than the exposure value of the auto mode by a value of "1".

12. The method of claim 1, wherein an exposure value of the long exposure time is greater than an exposure value of the short exposure time.

13. An apparatus for processing an image, the apparatus comprising:
    a processor to control following processor-executable units;
    a motion information estimating unit to estimate motion information based on a base frame among input frames captured using a short exposure time;
    a noise removing unit to remove noise from the base frame using the estimated motion information; and
    an image quality enhancing unit to enhance an image quality of the base frame from which the noise has been removed using a reference frame captured using a long exposure time,
    wherein the noise removing unit is configured to perform noise filtering on a temporal axis of the base frame based on the estimated motion information and is configured to perform noise filtering on a spatial axis of the base frame for which the noise filtering has been performed on the temporal axis.

14. The apparatus of claim 13, wherein the motion information estimating unit estimates global motion information and local motion information using brightness information of the input frames.

15. The apparatus of claim 14, wherein the motion information estimating unit estimates global motion information using an image matching scheme based on an image difference between the input frames.

16. The apparatus of claim 14 wherein the motion information estimating unit estimates the global motion information using cumulative one-dimensional (1D) curves for horizontal and vertical directions of the input frames, and a cross correlation maximization searching scheme.

17. The apparatus of claim 14, wherein the image quality enhancing unit enhances an image quality of the base frame using a brightness conversion relationship between the base frame and the reference frame.

18. A method of processing an image, the method comprising:
    capturing an image frame using a relatively short exposure time;
    capturing a reference frame using a relatively longer exposure time in comparison with the relatively short exposure time;
    estimating motion information based on the image frame;
    removing, by way of a processor, noise from the image frame using the estimated motion information; and
    restoring, by way of the processor, the image frame using the reference frame,
    wherein the removing of the noise from the image frame comprises:
    performing noise filtering on a temporal axis of the image frame based on the estimated motion information; and
    performing noise filtering on a spatial axis of the image frame for which the noise filtering has been performed on the temporal axis.

19. The method of claim 18, wherein in the restoring of the image frame, the image frame is restored to have enhanced levels of brightness and color compared with the levels of brightness and color of the image frame.

20. The method of claim 18, wherein the reference frame is captured using high ISO sensitivity conditions.

* * * * *